Patented May 5, 1936

2,039,929

UNITED STATES PATENT OFFICE 2,039,929

PROCESS FOR THE MANUFACTURE OF 2-KETO-LEVO-GULONIC ACID AND PRODUCT THEREOF

Tadeus Reichstein, Zurich, Switzerland, assignor to Hoffmann-La Roche Inc., Nutley, N. J., a corporation of New Jersey No Drawing. Application February 6, 1935, Serial No. 5,305. In Switzerland March 15, 1934

6 Claims. (Cl. 260—112)

According to the process of U. S. patent application Serial No. 748,925 2-keto-levo-gulonic acid is obtained by transforming levo-sorbose with the aid of carbonyl compounds, such as formaldehyde, acetone, methyl-ethyl-ketone, benzaldehyde, into bis-methylene-ether derivatives, treating these in alkaline solution with oxidizing agents, which oxidize a CH2OH group to the COOH group, and heating the bis-methylene-ether-2-keto-levo-gulonic acids thus obtained with water or with dilute acids in order to split off the carbonyl compounds.

It has now been found, that the compounds of levo-sorbose with alicyclic ketones containing a nuclear keto group are likewise easily transformed into 2-keto-levo-gulonic acid. The intermediates thus obtained crystallize well, so that they may easily be purified.

Example 5 parts by weight of levo-sorbose, 40 parts by weight of cyclo-hexanone and 2 parts by weight of concentrated sulphuric acid are shaken mechanically in a glass-stoppered bottle for 20 hours. The brown solution is diluted with ether and shaken with potash solution. After drying the solution is liberated from the ether and cyclo-hexanone by distilling, and the residue is distilled in high vacuum. An almost colourless thick oil is obtained which boils at 195–199° C. at 0.2 mm. pressure; it solidifies to a glassy mass and when stirred with hot benzine it partially crystallizes almost immediately. After suction and washing with benzine, the crystals represent the pure mono-cyclo-hexanone compound with a melting point of 161–162° C. The di-cyclo-hexanone-sorbose is obtained from the benzine solution. It crystallizes in fine needles melting at 124° C. (corr.) and is easily soluble in the cold in most organic solvents except benzine and petroleum ether. Benzine and petroleum ether likewise dissolve the compound when heated. In water the compound is almost insoluble. Its specific rotation is $[\alpha]_D^{18} = -23°(c=2.07$ in absolute methanol$)$ 5 parts by weight of di-cyclo-hexanone-levo-sorbose are suspended in a solution of 0.51 part of potassium hydroxide in 15 parts by weight of water. Then 30 parts by weight of pyridine (stable to permanganate) and a solution of 0.95 part by weight of potassium permanganate in 25 parts by weight of water are added. The reaction product is shaken while heating to 60° C., until the colouring of the permanganate has completely disappeared, then removed from the manganese dioxide by suction and washed with water. The filtrate is treated with carbonic acid and sulphuric acid until it is no longer alkaline to phenolphthaleine, but still alkaline to litmus paper, whereafter the product is dried in vacuo. The solid residue is freed from any di-cyclo-hexanone-sorbose remaining unchanged by treatment with ether and hereafter the potassium salt of the acid is extracted by repeated boiling with absolute alcohol. On cooling the filtered alcoholic solution it crystallizes in needles, which are easily soluble in water, rather difficultly soluble in absolute alcohol and insoluble in ether and benzene. By recrystallization from absolute alcohol the potassium salt may be obtained analytically pure. Its specific rotation is $[\alpha]_D^{18} = -15.6°(c=0.8$ in water$)$ 1.3 parts by weight of the potassium salt are dissolved in 4 parts by weight of water, 2 parts by weight of ice are added and thereafter a solution of 0.6 part by weight of concentrated sulphuric acid in 5 parts by weight of water and 1 part by weight of ice. The acid, which is immediately precipitated, is removed by suction, washed with ice water and dried in high vacuum. After recrystallization from benzene-benzine it is obtained as colourless leaflets melting at 132–133° C. The di-cyclo-hexanone-2-keto-levo-gulonic acid forms colourless leaflets melting at 132–133° C.; it is easily soluble in ether, benzene and similar solvents, difficultly soluble in benzine, petroleum ether and the like. In water it is rather difficultly soluble. Its specific rotation is $[\alpha]_D^{18} = -23.4°(c=0.92$ in chloroform$)$ 5 parts by weight of di-cyclo-hexanone-2-keto-levo-gulonic acid are boiled with 100 parts by weight of water. The crystals first become pasty, then they are slowly dissolved. The solution is then evaporated in vacuo. After seeding with 2-keto-levo-gulonic acid crystallization immediately sets in. The product thus obtained is identical with the 2-keto-levo-gulonic acid obtained according to the process of U. S. patent application Serial No. 748,925.

I claim:

1. The process for the manufacture of 2-keto-levo-gulonic acid, which consists in transforming levo-sorbose with the aid of alicyclic ketones containing a nuclear keto group into bis-methylene-ether derivatives, treating these in alkaline solution with oxidizing agents which oxidize a CH2OH group to a COOH group, and splitting off the alicyclic ketones from the bis-methylene-ether-2-keto-levo-gulonic acid thus obtained by heating with water at an acid reaction.

2. The process for the manufacture of 2-keto-levo-gulonic acid, which consists in transforming levo-sorbose with the aid of cyclo-hexanone into di-cyclo-hexanone-levo-sorbose, treating the said di-cyclo-hexanone-levo-sorbose in alkaline solution with oxidizing agents which oxidize a $CH_2OH$ group to a COOH group, and splitting off the cyclo-hexanone from the di-cyclo-hexanone-2-keto-levo-gulonic acid thus obtained by heating with water at an acid reaction.

3. The process for the manufacture of 2-keto-levo-gulonic acid, which consists in transforming levo-sorbose with the aid of cyclo-hexanone into di-cyclo-hexanone-levo-sorbose, treating the said di-cyclo-hexanone-levo-sorbose in alkaline solution with potassium permanganate and splitting off the cyclo-hexanone from the di-cyclo-hexanone-2-keto-levo-gulonic acid thus obtained by heating with water at an acid reaction.

4. As a new product a member of the group consisting of di-cyclo-hexanone-2-keto-levo-gulonic acid, and its salts.

5. As a new product, di-cyclo-hexanone-2-keto-levo-gulonic acid.

6. As new products, the condensates of levo-sorbose and an alicyclic ketone containing a nuclear keto group, said products having the terminal primary alcohol group oxidized to a carboxyl group.

TADEUS REICHSTEIN.